United States Patent
Massaro et al.

(10) Patent No.: US 9,176,549 B2
(45) Date of Patent: Nov. 3, 2015

(54) HEAT DISSIPATING CASE

(75) Inventors: Kevin L. Massaro, Houston, TX (US); Mark David Senatori, The Woodlands, TX (US); Ilchan Lee, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 129 days.

(21) Appl. No.: 14/235,300

(22) PCT Filed: Jul. 29, 2011

(86) PCT No.: PCT/US2011/046017
§ 371 (c)(1),
(2), (4) Date: Jan. 27, 2014

(87) PCT Pub. No.: WO2013/019196
PCT Pub. Date: Feb. 7, 2013

(65) Prior Publication Data
US 2014/0160659 A1   Jun. 12, 2014

(51) Int. Cl.
*G06F 1/20* (2006.01)
*H05K 7/20* (2006.01)
*G06F 1/16* (2006.01)

(52) U.S. Cl.
CPC .............. *G06F 1/203* (2013.01); *G06F 1/1601* (2013.01); *G06F 1/20* (2013.01); *G06F 1/206* (2013.01); *G06F 2200/202* (2013.01)

(58) Field of Classification Search
CPC ... G06F 1/203; G06F 15/0216; G06F 1/1628; G06F 1/206; G06F 2200/203; G06F 1/20
USPC ............... 361/679.01–679.3, 679.41–679.46, 361/679.55–679.59, 690, 692; 312/223.1, 312/223.2
See application file for complete search history.

(56) References Cited

U.S. PATENT DOCUMENTS

| | | | |
|---|---|---|---|
| 6,288,896 B1 | 9/2001 | Hsu | |
| 6,437,978 B1 * | 8/2002 | Ozaki et al. | 361/679.46 |
| 6,816,371 B2 * | 11/2004 | Agata et al. | 361/679.27 |
| 7,254,019 B2 | 8/2007 | Leu et al. | |
| 7,746,631 B2 | 6/2010 | Ali | |
| 2005/0111183 A1 * | 5/2005 | Pokharna et al. | 361/687 |
| 2008/0130221 A1 | 6/2008 | Varadarajan et al. | |
| 2009/0154084 A1 | 6/2009 | Goto et al. | |
| 2009/0207569 A1 | 8/2009 | Tsunoda et al. | |
| 2012/0155020 A1 * | 6/2012 | Nishi | 361/679.55 |

(Continued)

FOREIGN PATENT DOCUMENTS

| CN | 1508649 A | 6/2004 |
|---|---|---|
| KR | 20-0225459 | 6/2001 |

(Continued)

OTHER PUBLICATIONS

International Search Report and Written Opinion received in PCT Application No. PCT/US2011/046017, mailed on Feb. 28, 2012, 9 pgs.

*Primary Examiner* — Nidhi Thaker
(74) *Attorney, Agent, or Firm* — HP Legal Department

(57) ABSTRACT

Example embodiments disclosed herein relate to a case having a base unit and a display unit. The base unit includes an emitting surface. The display unit includes a dissipating member. A hinge connects the base unit and the display unit, the hinge connected below at least part of the heat emitting surface or first vent and the heat dissipating member or second vent. The emitting surface and the dissipating member are to overlap or align when the display unit is in a closed position.

15 Claims, 5 Drawing Sheets

(56) References Cited

U.S. PATENT DOCUMENTS

2013/0163201 A1* 6/2013 Wang et al. .................. 361/692
2014/0029187 A1* 1/2014 Okuley et al. ............ 361/679.09
2014/0098489 A1* 4/2014 Chiriac et al. ........... 361/679.54

FOREIGN PATENT DOCUMENTS

| KR | 10-0513010 | 9/2005 |
| TW | 200850104 A | 12/2008 |
| TW | 201024981 A | 7/2010 |

* cited by examiner

HEAT DISSIPATING CASE

BACKGROUND

Case designs of devices are increasingly changing to accommodate for user preferences. For example, some cases have adopted a dropped hinge to lower a height of a display of the device. Device manufacturers are challenged to provide new case designs that enhance or do not limit a functionality of the device.

BRIEF DESCRIPTION OF THE DRAWINGS

The following detailed description references the drawings, wherein.

DETAILED DESCRIPTION

Figure 1:
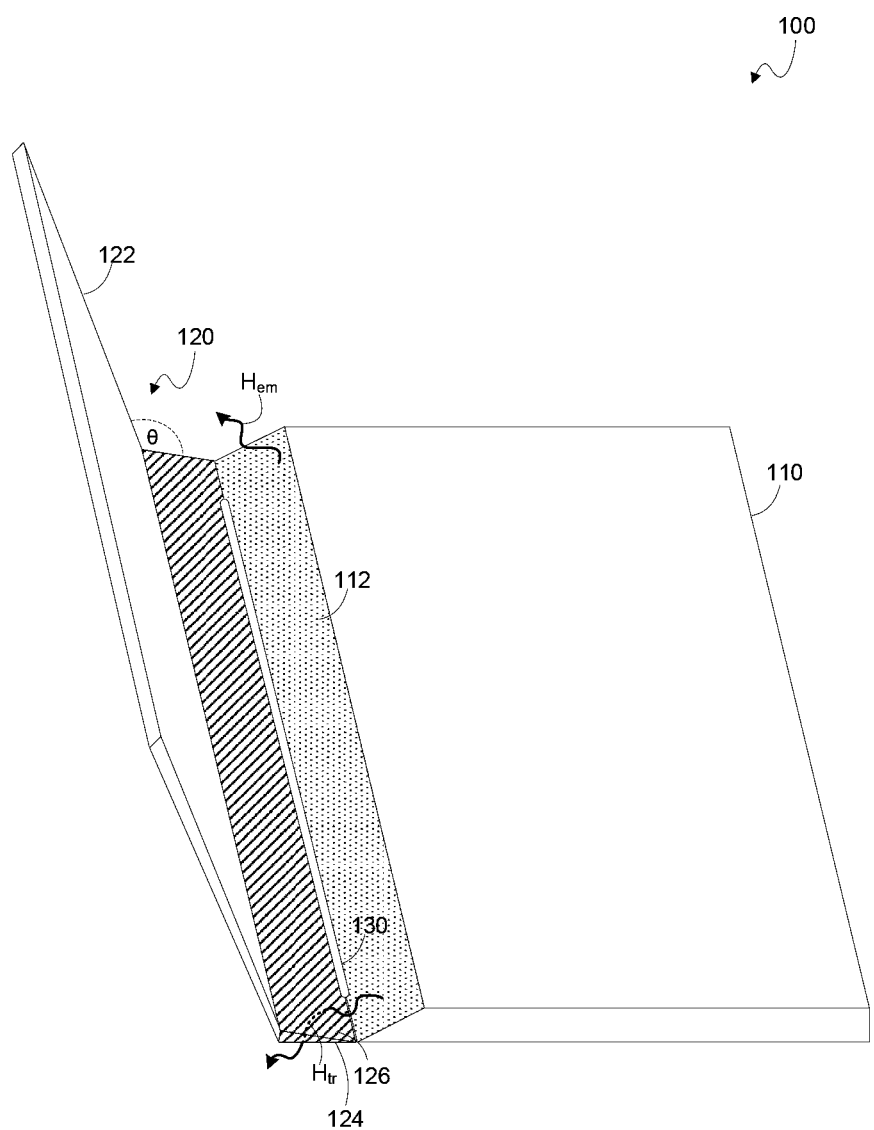
FIG. 1 is an example diagram of a perspective view of a case.

Specific details are given in the following description to provide a thorough understanding of embodiments. However, it will be understood by one of ordinary skill in the art that embodiments may be practiced without these specific details. For example, systems may be shown in diagrams in order not to obscure embodiments in unnecessary detail. In other instances, well-known processes, structures and techniques may be shown without unnecessary detail in order to avoid obscuring embodiments.

The terms above and below will be construed relative to a current orientation of a device shown in the drawings. If an orientation of the device is changed, such as if the orientation is upside down, the terms above and below are to remain construed relative to the orientation shown in the drawings.

Some recent devices, such as notebooks, have adopted a dropped hinge, which has an axis located at a lower point than a traditional hinge. The dropped hinge usually connects a lid of the notebook to a base of the notebook. The dropped hinge lowers a height of a display panel of the lid.

However, the dropped hinge may cause a bottom of the lowered lid to overlap at least a portion of a first side of the base to which the hinge connects. As a result, any thermal exhaust ports located at the first side of the base may be at least partially obstructed by the lid.

Embodiments provide a type of dropped hinge that connects the lid to the first side the base but still allows for heat to pass freely from thermal exhaust ports located at the first side of the base and through at least part of the lid, regardless of whether the lid is an open or closed position.

Embodiments may also include for at least one cable between the lid and the base to be placed along a retractable clutch located above the hinge. Thus, the cable may not obstruct the heat from passing through at least part of the lid while also providing a thinner profile and smoother rotation for the hinge. In addition, the hinge may have only a single arm resulting in a simpler design.

Looking at the drawings, FIG. 1 is an example diagram of a perspective view of a case 100. The case 100 may include or be part of an electronic device such as, a notebook computer, a desktop computer, an all-in-one system, a slate computing device, a portable reading device, a wireless email device, a mobile phone, a computing system and the like.

In the embodiment of FIG. 1, the case 100 may enclose a notebook computer and includes a base unit 110 and a display unit 120. The base unit 110 includes a heat emitting surface 112 at a first side of the base unit 110 to emit heat, for example, an opening and/or heat conductive surface. The base unit 110 may also enclose a heal generating component (not shown) to generate heat, with the heat emitting surface 112 to emit the heat of the heat generating unit. The heat generating component may include, for example, a processor. A surface of the base unit 110 and/or display unit 120 may be made of any material in the art, such as a type of plastic, metal, or rubber.

The display unit 120 includes a lid 122 and a stand 124. The stand 124 includes a heat dissipating member 126 to dissipate heat, such as the heat emitted by the heat emitting surface 112. The heat dissipating member 126 may be, for example, an opening and/or heat conductive surface. The opening of the heat emitting surface 112 and/or heat dissipating member 126 may, for instance, be an air vent including a regular or irregular pattern of one or more apertures for the heat to pass through, such as a grill or grid of holes. In addition, a thickness of at least part of the stand 124, such as at the heat dissipating member 126, may be substantially less than that of the lid 122.

The lid 122 is connected to the stand 124 and above the stand 124. The lid 122 may enclose a display (not shown). The term display may refer to any type of electronic visual display device. Examples of the display may include an integrated display device, such as a Liquid Crystal Display (LCD) panel, a plasma panel or other type of display panel.

The angle θ between the lid 122 and the stand 124 may be variable according to, for example, a manufacturing design or user specification. Further, the angle θ between the stand 124 and the lid 122 may be acute or inward with respect to the base unit 110. For instance, the angle θ may be between 90 degrees and 180 degrees.

The case 100 also includes a hinge 130 to connect the base unit 110 and the display unit 120 at the first side of the base unit 110. In FIG. 1, the hinge 130 is connected below the heat emitting surface 112 and the heat dissipating member 126. In embodiments, the hinge 130 may be connected below an entirety or part of the heat emitting surface 112 and the heat dissipating member 130. For example, the hinge 130 may be connected below one or more openings of the heat emitting surface 112 and the heat dissipating member 126.

The hinge 130 may also include and/or interface with a friction component (not shown), such as a friction or detent hinge, to maintain a position of the display unit 120. Thus, the display unit 120 may maintain multiples types of open positions situated along different angles of an axis of the hinge 130.

The hinge 130 may be referred to as a dropped hinge, due to its low axis near a bottom surface of the base unit 110. The hinge 120 may rotate the display unit from a lower point and lower the height of the display. While the hinge 130 in FIG. 1 is shown as a single, continuous hinge, embodiments of the hinge 130 may include various types of one or more hinges of various diameters and/or lengths.

As shown in FIG. 1, the heat emitting surface 112 is exposed when the display unit 120 of the case 100 is an open position. As a result the heat may emit freely out of the heat emitting surface 112, as shown by emitted heat line $H_{em}$. Further, at least some of the emitted heat may also pass through the heat dissipating member 126, as shown by transmitted heat line $H_{tr}$.

Figure 2:
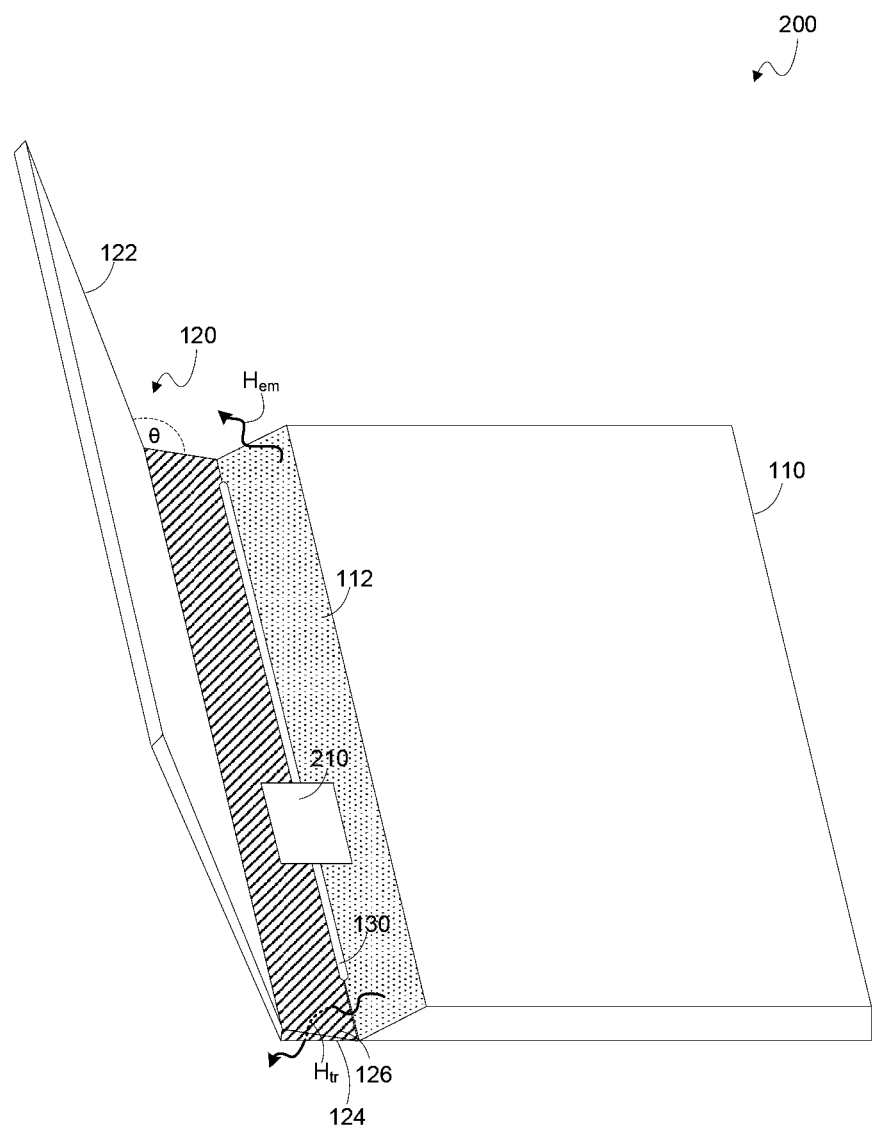
FIG. 2 is an another example diagram of a perspective view of a case.

FIG. 2 is another example diagram of a perspective view of a case 200. In this embodiment, the case 200 of FIG. 2 may be similar to the case 100 of FIG. 1, except the case 200 may also include a cable connection 210 between the display unit 120 and the first side of the base unit 110, where the cable connection 210 is above the hinge 130. In addition, as shown in FIG. 2, the cable connection 210 may be between the heat emitting surface 112 and the heat dissipating member 126.

Further, the cable connection 210 may include a retractable member housing cables, such as power and data cables, which connect between the base unit 110 and the display unit 120. The retractable member is to move into the base unit 110 when the display unit 120 is rotated towards the base unit 110 and to move out of the base unit 110 when the display unit 120 is rotated away from the base unit 110. While the cable connection 210 is shown to be closer to a left side of the base unit 110 in FIG. 2, embodiments are not limited thereto. For example, the cable connection 210 may be placed at any point between the heat emitting surface 112 and the heat dissipating member 126 and/or over the hinge 130.

In addition, the case 200 of FIG. 2 may have the friction component (not shown), such as a clutch, interface with the retractable member, instead of the hinge 130. For example, the friction component may be located inside the base unit 110 and inhibit a movement of the retractable member, to maintain a position of the display unit 120. Thus, the display unit 120 may similarly maintain multiples types of open positions situated along different angles of an axis of the hinge 130. However, the hinge 130 may be slimmer and/or simpler in design, by having the friction component placed away from the hinge 130.

Figure 3A:
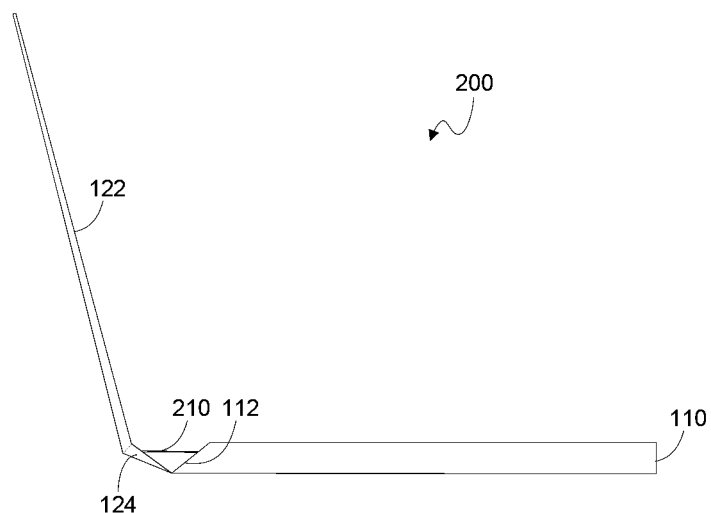
FIG. 3A is an example diagram of a side-view of the case of FIG. 2 with respect to an open position.
Figure 3B:
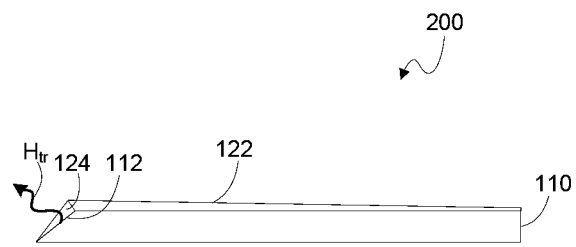
FIG. 3B is an example diagram of a side-view of the case of FIG. 2 with respect to a closed position.

FIG. 3A is an example diagram of a side-view of the case of FIG. 2 with respect to an open position. FIG. 3B is an example diagram of a side-view of the case 200 of FIG. 2 with respect to a closed position. As shown in FIG. 3A, the cable connection 210 extends between the heat emitting surface 112 and the heat dissipating member 126 and over the hinge 130. While the cable connection 210 is shown to be substantially straight, embodiments are not limited thereto. For example, the cable connection 210 may also have a curved shape.

As shown in FIG. 3B, a gap between the heat diffusing surface 112 and the heat dissipating member 124 is substantially small when the display unit 120 is in the closed position. For example, the heat diffusing surface 124 and the heat dissipating member 112 may have complementary surfaces facing each other so as to have the substantially small gap or no gap therebetween. For example, the gap may be 1 millimeter (mm) or less.

Further, as shown by the transmitted heat line $H_{tr}$, heat may pass out of the heat dissipating member 112 and through the heat diffusing surface 124, even the when the display unit 120 is in the closed position. For example, an opening or air vent of the heat diffusing surface 112 may align with that of the heat dissipating member 124 so that heated air may flow freely out of the base unit 110, when the display unit 120 is in a closed position.

Further, as shown in FIG. 3B, the cable connection 210 is not visible between the heat diffusing surface 112 and the heat dissipating member 124 when the display unit 120 is in a closed position. Instead, the cable connection 210 may, for example, retract into the base unit 110.

Figure 4A:
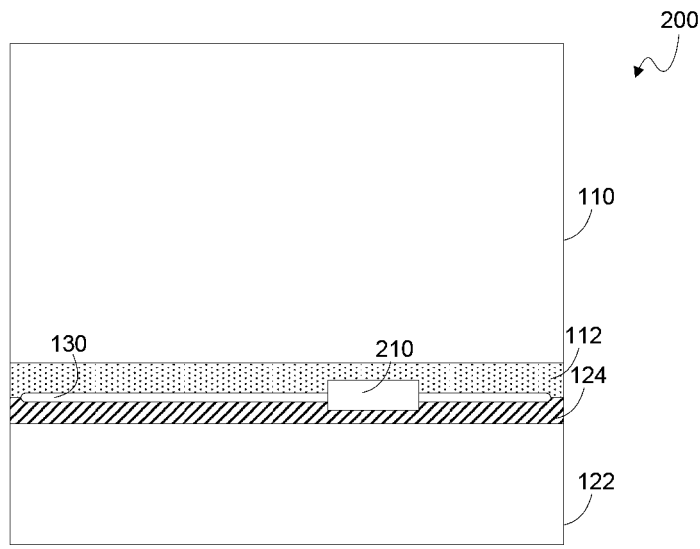
FIG. 4A is an example diagram of a top-down view of the case of FIG. 2 with respect to the open position.
Figure 4B:
FIG. 4B is an example diagram of a top-down view of the case of FIG. 2 with respect to the closed position.

FIG. 4A is an example diagram of a top-down view of the case 200 of FIG. 2 with respect to the open position. FIG. 4B is an example diagram of a top-down view of the case 200 of FIG. 2 with respect to the closed position. As shown in FIG. 4A, the heat emitting surface 112 and the heat dissipating member 124 may not overlap when display unit 120 is in the open position. However, as shown in FIG. 4B, the heat emitting surface 112 and the heat dissipating member 124 are to overlap when display unit is in a closed position.

Figure 5:
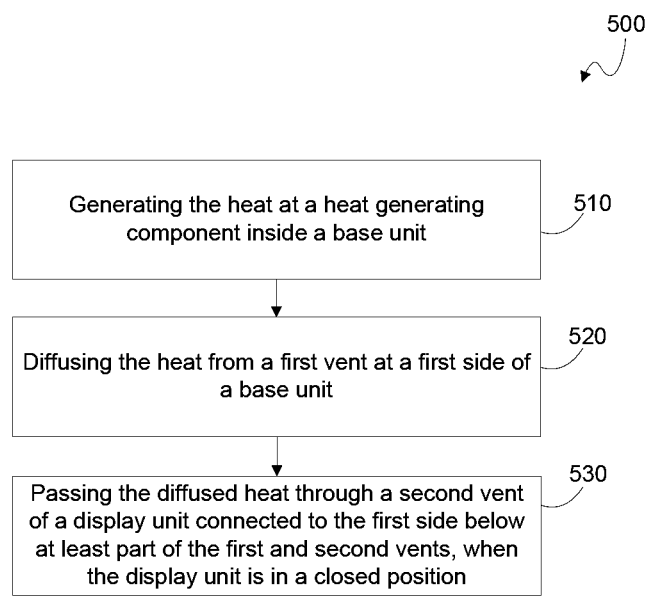
FIG. 5 is an example flow chart for a method of dissipating heat.

FIG. 5 is an example flow chart for a method 500 of dissipating heat. Although execution of method 500 is described below with reference to the case 100, other suitable components for execution of the method 500 can be utilized, such as the case 200. At block 510, a heat generating component inside the base unit 110 generates the heat. Then, at block 520, the heat diffusing surface 112 or a first vent at a first side of a base unit 110 diffuses the heat. Lastly, at block 530, the diffused heat passes through heat dissipating member 124 or a second vent of the display unit 120 connected to the first side via a hinge 130 below at least part of the first and second vents, when the display unit 120 is in a closed position.

According to the foregoing, embodiments provide a method and/or a dropped hinge for connecting a display unit to a first side a base unit while allowing for heat to pass freely from the first side of the base unit and through at least part of the display unit, regardless of whether the display unit is an open or closed position. In addition, embodiments may also include a retractable member above the hinge. Thus, the cables may not obstruct the heat from passing through at least part of the display unit while also providing a thinner profile and smoother rotation for the hinge.

What is claimed is:

1. A case, comprising:
a base unit including an emitting surface;
a display unit including,
a stand having a heat dissipating member, and
a lid connected to the stand, the lid being above the stand; and
a hinge to connect the base unit and the display unit, the hinge connected below at least part of the heat emitting surface and the heat dissipating member, wherein
the heat emitting surface and the heat dissipating member are to overlap when display unit is in a closed position.

2. The case of claim 1, further comprising:
a cable connection between the display unit and the base unit, wherein
the cable connection is above the hinge.

3. The case of claim 2, wherein the cable connection includes a retractable member, the retractable member to move into the base unit when the display unit is rotated towards the base unit and to move out of the base unit when the display unit is rotated away from the base unit.

4. The case of claim 3, further comprising:
a friction component connected to the retractable member, the friction component to inhibit a movement of the retractable member to maintain a position of the display unit.

5. The case of claim 2, wherein the cable connection is between the heat emitting surface and the heat dissipating member.

6. The case of claim 1, wherein the heat dissipating member includes an opening to allow the heat to pass through the opening.

7. The case of claim 1, wherein the hinge is connected below an entirety of the heat emitting surface and the heat dissipating member.

8. The case of claim 1, wherein an angle between the stand and the lid is acute with respect to the base unit.

9. The case of claim 1, wherein the heat diffusing surface is exposed when the display unit is an open position.

10. The case of claim 1, wherein a gap between the heat diffusing surface and the heat dissipating member is substantially small when the display unit is in the closed position.

11. The case of claim 1, wherein,
a thickness of at least part of the stand is less than the lid, and
the lid includes a display.

12. A case, comprising:
a base unit including,
a heat generating component to generate heat,
a vent at a first side of the base to dissipate the heat of the heat generating unit;
a display unit including,
a display, and
an opening to align with at least part of the vent if the display unit is in a closed position; and
a hinge to connect the display unit to the first side of the base.

13. The case of claim 12, wherein the hinge is connected below at least part of the vent and the opening.

14. The case of claim 12, further comprising:
a cable connection between the display unit and the base at the first side,
wherein the cable connection is above the hinge.

15. A method for dissipating heat from a case, comprising:
generating the heat at a heat generating component inside a base unit;
diffusing the heat from a first vent at a first side of the base unit; and
passing the diffused heat through a second vent of a display unit connected to the first side via a hinge below at least part of the first and second vents, if the display unit is in a closed position, wherein the first and second vents overlap when the display unit is in the closed position.

* * * * *